US008090119B2

(12) United States Patent
Kondo

(10) Patent No.: US 8,090,119 B2
(45) Date of Patent: Jan. 3, 2012

(54) NOISE SUPPRESSING APPARATUS AND PROGRAM

(75) Inventor: Kazunobu Kondo, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 916 days.

(21) Appl. No.: 12/062,250

(22) Filed: Apr. 3, 2008

(65) Prior Publication Data

US 2008/0247569 A1 Oct. 9, 2008

(30) Foreign Application Priority Data

Apr. 6, 2007 (JP) ................................ 2007-100757

(51) Int. Cl.
*H04B 15/00* (2006.01)

(52) U.S. Cl. ...................................................... 381/94.1

(58) Field of Classification Search .................... 381/92, 381/93, 94.1, 94.2, 94.3; 375/355, 326; 704/204
See application file for complete search history.

(56) References Cited

U.S. PATENT DOCUMENTS 6,453,288 B1 9/2002 Yasunaga et al.
6,912,496 B1 6/2005 Bhattacharya et al.
7,050,827 B2 * 5/2006 Lai et al. .................... 455/550.1
7,170,266 B1 * 1/2007 Seven et al. .................... 323/268
7,342,168 B2 * 3/2008 Setoguchi ........................ 84/619
7,360,048 B2 * 4/2008 Agombar et al. ............. 711/162
7,590,523 B2 * 9/2009 Gao ........................... 704/200.1
7,797,153 B2 * 9/2010 Hiroe ............................ 704/211
7,843,263 B2 * 11/2010 Wu et al. ....................... 330/251
2007/0094013 A1 * 4/2007 Pang et al. .................... 704/204
2008/0030267 A1 * 2/2008 Yang .............................. 330/10
2009/0196435 A1 * 8/2009 Miao ............................ 381/94.5
2009/0210177 A1 * 8/2009 McCullough et al. ........... 702/60
2011/0060593 A1 * 3/2011 Hu ................................ 704/500
2011/0065403 A1 * 3/2011 Muhammad et al. ...... 455/232.1

FOREIGN PATENT DOCUMENTS

JP 10-149198 A 6/1998

(Continued)

OTHER PUBLICATIONS

Ephraim, Yariv; Speech Enhancement Using a Minimum Mean-Square Error Short-Time Spectral Amplitude Estimator, IEEE Transactions on Acoustics, Speech, and Signal Processing, vol. ASSP-32, No. 6, Dec. 1984.

(Continued)

*Primary Examiner* — Nathan Ha
(74) *Attorney, Agent, or Firm* — Morrison & Foerster LLP

(57) ABSTRACT

A noise suppressing apparatus suppresses a noise component of a sound signal which contains the noise component and a signal component. In the apparatus, a frequency analyzing section divides the sound signal into a plurality of frames such that adjacent frames overlap with each other along a time axis, and computes a first spectrum of each frame. A noise suppressing section suppresses a noise component of the first spectrum so as to provide a second spectrum of each frame in which the noise component is suppressed. A frequency specifying section specifies a frequency of a noise component of each frame. A phase controlling section varies a phase of the noise component corresponding to the specified frequency in the second spectrum by a different variation amount each frame. A signal synthesizing section combines the frames after the second spectrum of each frame is processed by the phase controlling section, such that adjacent frames overlap with each other along the time axis so as to output the sound signal.

7 Claims, 4 Drawing Sheets

FOREIGN PATENT DOCUMENTS

| | | |
|---|---|---|
| JP | 2003-131689 | 5/2003 |
| JP | 2006-113515 A | 4/2006 |
| WO | WO-98/20483 A1 | 5/1998 |

OTHER PUBLICATIONS

European Search Report mailed Sep. 21, 2011, for EP Patent Application No. 08103318.5, six pages.

Seok, J-W. et al. (Jan. 21, 1999). "Reduction of Musical Noise in Spectral Substraction Method Using Subframe Phase Randomisation," *Electronics Letters* 35(2), two pages.

Notification of Reasons for Rejection mailed Sep. 13, 2011, for JP Patent Application No. 2007-100757, with English Translation, six pages.

* cited by examiner

NOISE SUPPRESSING APPARATUS AND PROGRAM

BACKGROUND OF THE INVENTION

1. Technical Field

The present invention relates to a technique for suppressing a noise component for a signal representing a sound (hereinafter, referred to as "sound signal") in which a desired signal component (target sound component) and a noise component are mixed.

2. Background Art

Conventionally, various techniques for suppressing a noise component of a sound signal (or emphasizing a signal component) have been proposed. For example, in Non-Patent Document 1 or Patent Document 1, a spectrum subtraction method for subtracting an estimated spectrum of a noise component (hereinafter, referred to as "estimation noise spectrum) from a spectrum of a sound signal is disclosed.

[Non-Patent Document 1] Ephraim Y., Malah D., "Speech enhancement using a minimum-mean square error short-time spectral amplitude estimator", DECEMBER 1984, IEEE TRANSACTIONS ON ACOUSTICS, SPEECH, AND SIGNAL PROCESSING, VOL. 32, NO. 6, PP. 1109-1121

[Patent Document 1] JP-A-2003-131689

However, in the technique of Non-Patent Document 1 or Patent Document 1, a noise component may not be completely removed. A noise component remaining in an interval in which the strength of a signal component is low is remarkably perceived by a listener. In particular, there is a problem in that a noise component irregularly remaining on a time axis and a frequency axis is perceived as strident musical noise (birdie noise). A level of suppressing an estimation noise spectrum from a spectrum of a sound signal needs to be increased in a situation where a signal to noise ratio is low, but the musical noise is remarkably perceived as the suppression level of the estimation noise spectrum is increased.

In view of the above situation, an object of the present invention is to make it difficult to perceive a noise component (particularly, musical noise).

A noise suppressing apparatus related to one aspect of the present invention is provided for addressing the above problem. The inventive noise suppressing apparatus suppresses a noise component of a sound signal which contains the noise component and a signal component. The noise suppressing apparatus comprises: a frequency analyzing section that divides the sound signal into a plurality of frames such that adjacent frames overlap with each other along a time axis, and that computes a first spectrum of each frame; a noise suppressing section that suppresses a noise component of the first spectrum so as to provide a second spectrum of each frame in which the noise component is suppressed; a frequency specifying section that specifies a frequency of a noise component of each frame; a phase controlling section that varies a phase of the noise component corresponding to the specified frequency in the second spectrum by a different variation amount each frame; and a signal synthesizing section that combines the frames after the second spectrum of each frame is processed by the phase controlling section, such that adjacent frames overlap with each other along the time axis so as to output the sound signal.

According to the above configuration, the clearness of the noise component is reduced by varying a phase of the noise component by a different variation amount in each frame. Accordingly, this can make it difficult to perceive a noise component (for example, musical noise) as compared with a configuration in which a sound signal after suppression by a noise suppressing section is directly output.

In case that a signal component is specified and then the remaining component is specified as a noise component, the frequency specifying section includes a section that specifies a frequency of a signal component. Moreover, the frequency specifying section uses any information to specify the frequency of the signal component. For example, the frequency of the noise component can be specified on the basis of the first spectrum computed in the frequency analyzing section or the second spectrum after processing by the noise suppressing section. The frequency of the noise component can be specified on the basis of a spectrum obtained by means separate from the frequency analyzing section or the noise suppressing section.

The noise suppressing apparatus related to a preferred aspect of the present invention includes a variation amount setting section that sets a different variation amount according to a random number generated for each frame. The phase controlling section varies the phase of the noise component corresponding to the specified frequency by the different variation amount set by the variation amount setting section for each frame. According to the above aspect, the clearness of musical noise can be effectively reduced since phase variation amounts of the frames are set according to random numbers.

According to a preferred aspect, the phase controlling section varies the phase of the noise component corresponding to the specified frequency provided that the specified frequency falls in a predetermined frequency range of the second spectrum. The predetermined frequency range is set, for example, to include a frequency capable of being easily perceived by a listener. According to the above aspect, there is advantageous in that an amount of processing by the phase controlling section is reduced in comparison with a configuration in which a phase is controlled for noise component frequencies over all frequency range. There can be adopted a configuration in which the phase controlling section selectively controls only a phase of a frequency belonging to a predetermined frequency range among noise component frequencies specified in the frequency specifying section, or a configuration in which the frequency specifying section specifies only a frequency belonging to a predetermined frequency range.

The noise suppressing apparatus related to the present invention is realized with hardware (an electronic circuit) of a DSP (Digital Signal Processor) or the like dedicated to suppress a noise component, and is also realized with a cooperation of a general-purpose arithmetic processing unit of a CPU (Central Processing Unit) or the like and a program. A computer program related to one aspect of the present invention is executable by a computer for suppressing a noise component of a sound signal which contains the noise component and a signal component. The computer program comprises: a frequency analyzing process of dividing the sound signal into a plurality of frames such that adjacent frames overlap with each other along a time axis, and computing first spectrum of each frame; a noise suppressing process of suppressing a noise component of the first spectrum so as to provide second spectrum of each frame in which the noise component is suppressed; a frequency specifying process of specifying a frequency of a noise component of each frame; a phase controlling process of varying a phase of the noise component corresponding to the specified frequency in the second spectrum by a different variation amount each frame; and a signal synthesizing process of combining the frames after the second spectrum of each frame is processed by the phase controlling section, such that adjacent frames overlap with each other along the time axis so as to output the sound signal.

Moreover, the present invention is provided as a method for suppressing a noise component. The noise suppressing method related to one aspect of the present invention suppresses a noise component of a sound signal which contains the noise component and a signal component. The method comprises: a frequency analyzing process of dividing the sound signal into a plurality of frames such that adjacent frames overlap with each other along a time axis, and computing first spectrum of each frame; a noise suppressing process of suppressing a noise component of the first spectrum so as to provide second spectrum of each frame in which the noise component is suppressed; a frequency specifying process of specifying a frequency of a noise component of each frame; a phase controlling process of varying a phase of the noise component corresponding to the specified frequency in the second spectrum by a different variation amount each frame; and a signal synthesizing process of combining the frames after the second spectrum of each frame is processed by the phase controlling section, such that adjacent frames overlap with each other along the time axis so as to output the sound signal.

DETAILED DESCRIPTION OF THE INVENTION

A: Configuration and Operation of Noise Suppressing Apparatus

Figure 1:
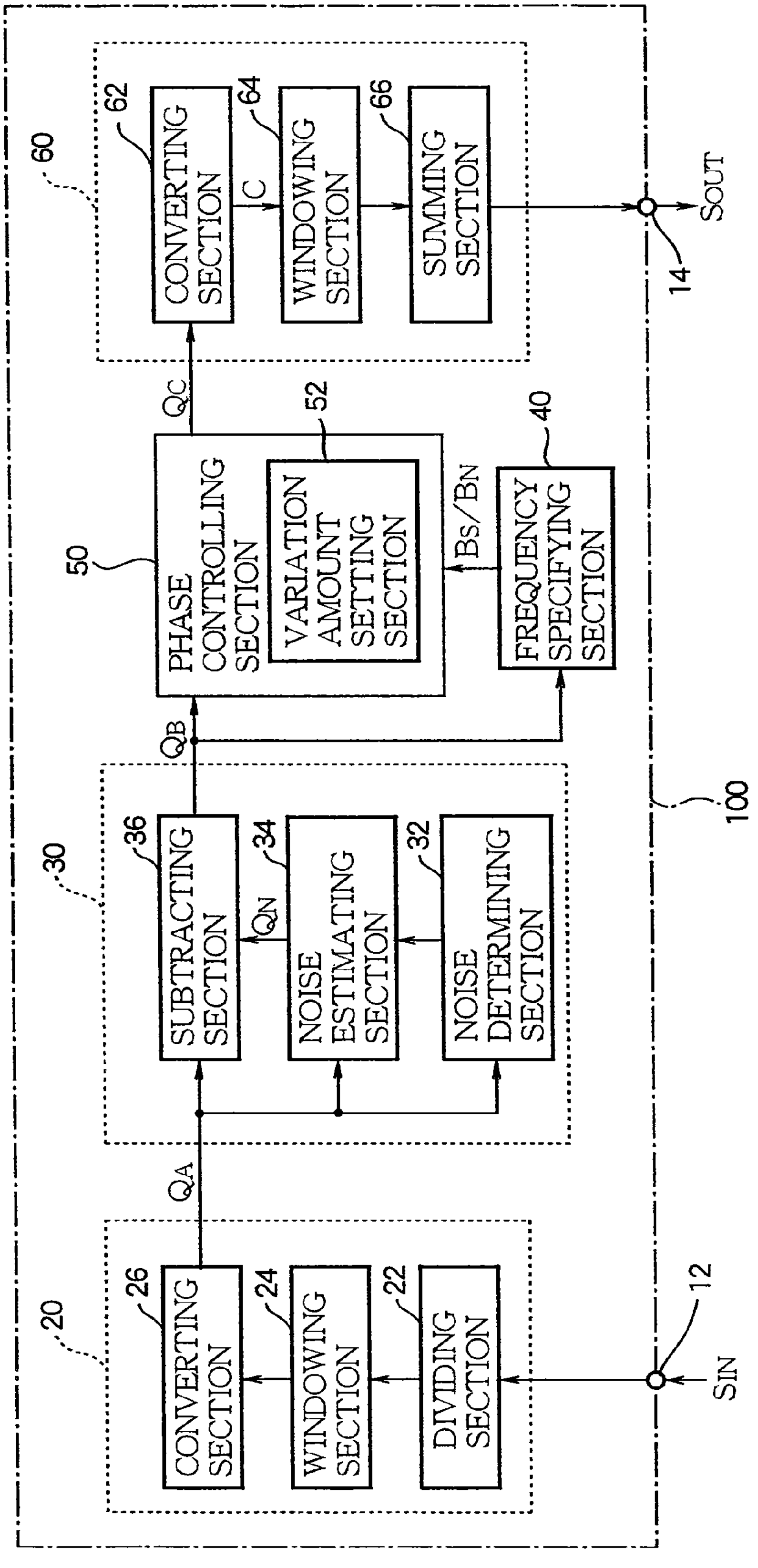
FIG. 1 is a block diagram showing a configuration of a noise suppressing apparatus related to an embodiment of the present invention.

FIG. 1 is a block diagram showing a configuration of a noise suppressing apparatus related to one embodiment of the present invention. As shown in the same figure, a sound signal SIN is supplied to an input terminal 12 of a noise suppressing apparatus 100. The sound signal SIN is a time domain signal representing a waveform of a sound (voice) in which a signal component and a noise component are mixed. The noise suppressing apparatus 100 generates an output sound signal SOUT by suppressing the noise component of the input sound signal SIN, and outputs the sound signal SOUT from an output terminal 14.

As shown in FIG. 1, the noise suppressing apparatus 100 includes a frequency analyzing section 20, a frequency suppressing section 30, a frequency specifying section 40, a phase controlling section 50, and a signal synthesizing section 60. The above elements are realized, for example, by making an arithmetic processing unit of a CPU or the like to execute a program. In this regard, the noise suppressing apparatus 100 is also realized by an electronic circuit of a DSP dedicated for voice processing or the like. The elements of FIG. 1 can be and arranged in a plurality of integrated circuits.

The frequency analyzing section 20 is means for computing a spectrum (amplitude spectrum or power spectrum) QA for each of a plurality of frames into which a sound signal SIN is divided on along time axis. As shown in FIG. 1, the frequency analyzing section 20 includes a dividing section 22, a windowing section 24, and a converting section 26. The dividing section 22 divides the sound signal SIN into a plurality of frames and sequentially outputs the divided frames. The frames adjacent to each other are partially overlapped along the time axis. That is, a time difference between the frames adjacent to each other is shorter than each frame time length. The windowing section 24 multiplies the sound signal SIN of each frame by a window function (for example, Hamming window or Hanning window).

The converting section 26 computes a first spectrum QA of a frequency domain by performing frequency analysis of an FFT (Fast Fourier Transform) process or the like for the sound signal SIN of each frame multiplied by the window function. As the converting section 26, any means (for example, a filter bank) for converting the sound signal SIN of a time domain into a frequency domain signal is adopted. The spectrum QA is expressed as a plurality of components (hereinafter, referred to as "frequency bins") corresponding to separate frequencies (or frequency bands).

The noise suppressing section 30 is means for suppressing the noise component from the spectrum QA computed in the frequency analyzing section 20. As shown in FIG. 1, the noise suppressing section 30 includes a noise determining section 32, a noise estimating section 34, and a subtracting section 36. The noise determining section 32 determines whether there is a signal component (or noise component) of each frame on the basis of the spectrum QA. The noise estimating section 34 generates an estimation noise spectrum QN by averaging spectra QA of a predetermined number of frames (frames within a noise interval) determined by the noise determining section 32 when the signal component is not included. The estimation noise spectrum QN is sequentially updated.

The subtracting section 36 generates a second spectrum QB by subtracting the estimation noise spectrum QN from the first spectrum QA of each frame sequentially supplied from the frequency analyzing section 20. There can be adopted a configuration in which a suppression level of the noise component is suitably adjusted by subtraction from the spectrum QA after multiplying the estimation noise spectrum QN by a predetermined coefficient (suppression coefficient).

A noise component averagely generated over a plurality of frames among spectra QA is effectively suppressed by the subtraction process by the subtracting section 36. However, a local noise component incidentally occurring in each frame is not completely removed by the processing in the subtracting section 36. As described above, the local noise component remaining in the spectrum QB is perceived as musical noise by the listener. The frequency specifying section 40 and the phase controlling section 50 function as means for making it difficult that the listener perceives the musical noise.

The frequency specifying section 40 is means for specifying a noise component frequency of the spectrum QB of each frame. In this embodiment, the frequency specifying section 40 classifies frequencies of a plurality of frequency bins (or frequency bands) configuring the spectrum QB into a frequency of a dominant signal component (hereinafter, referred to as "signal dominant frequency") BS and a frequency of a dominant noise component (hereinafter, referred to as "noise dominant frequency") BN. For the classification of the signal dominant frequency BS and the noise dominant frequency BN, for example, the following method is adopted.

A vocal sound has a property called harmonic structure in which a spectrum peak appears at a frequency of an integer multiple of a predetermined frequency (fundamental tone). The frequency specifying section 40 selects a frequency approximating each frequency (that is, the frequency of the integer multiple of the frequency of the fundamental tone) configuring the harmonic structure among a plurality of frequencies corresponding to a frequency bin as the signal dominant frequency BS, and selects each frequency other than the signal dominant frequency BS as the noise dominant frequency BN.

The phase controlling section 50 of FIG. 1 is means for controlling a phase of a noise component corresponding to the noise dominant frequency BN specified by the frequency specifying section 40. In this embodiment, the phase controlling section 50 includes a variation amount setting section 52. The variation amount setting section 52 is means for individually setting phase variation amounts for the respective frames. For example, means is provided for setting a phase variation amount of a corresponding frame according to a random number generated for each frame, as the variation amount setting section 52.

The phase controlling section 50 varies a phase of a component of the noise dominant frequency BN in the spectrum QB by a variation amount set for a corresponding frame in the variation amount setting section 52. That is, the phase variation amount of the component corresponding to the noise dominant frequency BN is different between the frames. Based on the second spectrum QB, a third spectrum QC containing each frequency bin of the signal dominant frequency BS and a frequency bin of the noise dominant frequency BN whose phase is controlled by the phase controlling section 50 are output from the phase controlling section 50 to the signal synthesizing section 60 on a frame by frame basis.

The signal synthesizing section 60 is means for synthesizing a sound signal SOUT of the time domain from the third spectrum QC of a plurality of frames. The signal synthesizing section 60 includes a converting section 62, a windowing section 64, and a summing section 66. The converting section 62 generates a time domain signal C for each frame by performing an inverse FFT process for the spectra QC. The windowing section 64 multiplies the sound signal C of each frame by a window function (for example, Hamming window or Hanning window). The summing section 66 generates a sound signal SOUT by sequentially combining sound signals C of the frames multiplied by the window function to be overlapped along the time axis. A type of window function or a window length may be common or different between the frequency analyzing section 20 and the signal synthesizing section 60.

The arithmetic content in which the phase controlling section 50 varies a phase of the noise dominant frequency BN by a variation amount θ is expressed by the following Expression (1).

$$S'(k)=S(k)e^{-j\theta} \tag{1}$$

In Expression (1), S(k) corresponds to a k-th frequency bin (frequency bin of the noise dominant frequency BN), and S'(k) corresponds to a k-th frequency bin after the phase is varied.

s'(m) computed by performing an inverse FFT process for S'(k) of Expression (1) in the converting section 62 is expressed as follows. W of Expression (2) is a rotator.

$$\begin{aligned} s'(m) &= \frac{1}{N}\sum_{k=0}^{N-1} S'(k)W_N^{-nk} \\ &= \frac{1}{N}\sum_{k=0}^{N-1} S(k)e^{-j\theta}W_N^{-nk} \\ &= \frac{1}{N}\sum_{k=0}^{N-1}\left\{\sum_{m=0}^{N-1} s(m)W_n^{mk}\right\}e^{-j\theta}W_N^{-nk} \\ &= e^{-j\theta}\left\{\frac{1}{N}\sum_{m=0}^{N-1} s(m)\sum_{k=0}^{N-1} W_N^{(m-n)k}\right\} \\ &= e^{-j\theta}s(m) \end{aligned} \tag{2}$$

As seen from Expression (2), s'(m) is a signal obtained by delaying a time domain signal S(m) corresponding to S(k) before processing by the phase controlling section 50 by a variation amount θ on the time axis. That is, noise components remaining after processing by the noise suppressing section 30 are delayed by individual delay amounts on a frame by frame basis, and are then overlapped and added in the summing section 66. That is, a process for adding components of the noise dominant frequency BN after phase variations by individual variation amounts θ on the frame basis corresponds to a process for applying the reverb effect to the musical noise.

As described above, this embodiment can make it difficult that the listener perceives musical noise (impression of a strident sound) since the reverb effect is applied to the musical noise in comparison with the conventional configuration in which the musical noise is clearly perceived when a voice is reproduced after processing by the noise suppressing section 30. Since noise component suppression by the noise suppressing section 30 and phase control by the phase controlling section 50 are individually performed, the perception of the musical noise is effectively reduced while the noise component is sufficiently suppressed in the noise suppressing section 30, even when a sound signal SIN whose signal to noise ratio is low is processed. Since the phase control by the phase controlling section 50 is selectively performed for only the noise dominant frequency BN in the spectrum QB, the signal component of the signal dominant frequency BS is maintained in the same clearness as that of the sound signal SIN.

B: Modified Example

The above embodiment can be variously modified. Aspects of concrete modifications are illustrated as follows. The following aspects can be suitably combined.

(1) Modified Example 1

In the above embodiment, a configuration for controlling a phase for a component of a noise dominant frequency BN over all frequency bands of the spectrum QB has been illustrated in the above embodiment, but a configuration for controlling a phase for only a noise dominant frequency BN within a specific frequency band (for example, a frequency range capable of being easily perceived by the listener) can also be adopted. For example, the phase controlling section 50 varies a phase of a noise dominant frequency BN belonging to a predetermined frequency band among noise dominant frequencies BN specified in the frequency specifying section 40, and does not vary a noise dominant frequency BN out of the corresponding frequency band. Moreover, the frequency specifying section 40 can specify only the noise dominant frequency BN belonging to the predetermined frequency band. As compared with a configuration for controlling a phase for all noise dominant frequencies BN, the above configuration is advantageous in that an amount of processing by the phase controlling section 50 is reduced.

(2) Modified Example 2

Figure 2:
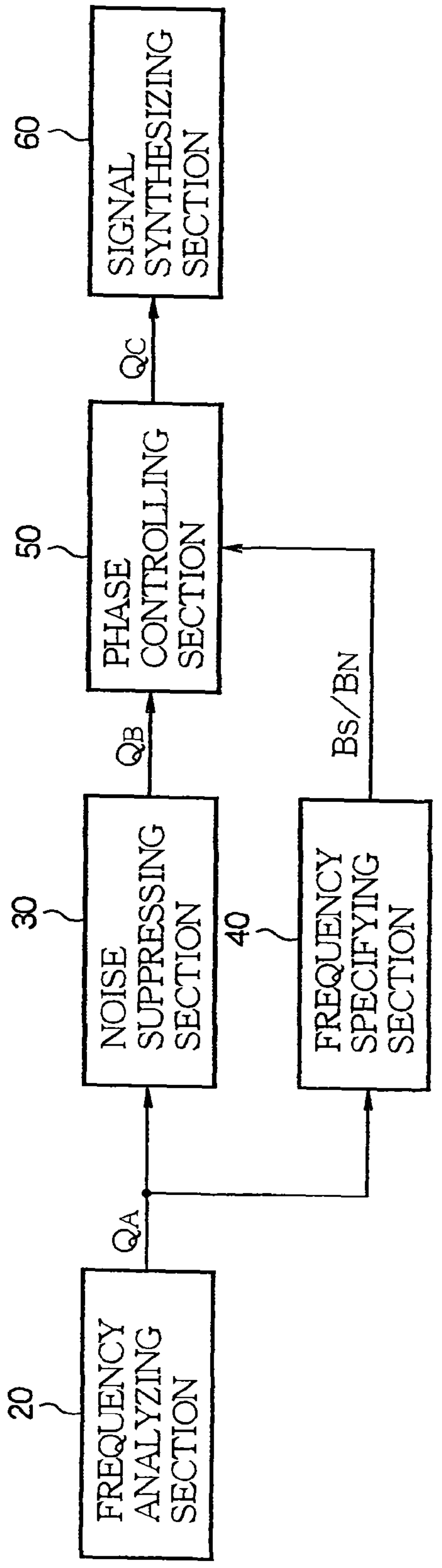
FIG. 2 is a block diagram showing a configuration of a noise suppressing apparatus related to a modified example.

As shown in FIG. 2, there can also be adopted a configuration in which the frequency specifying section 40 divides a noise dominant frequency BN and a signal dominant frequency BS using a harmonic structure of a first spectrum QA computed in the frequency analyzing section 20. In the second spectrum QB generated by the noise suppressing section 30, the phase controlling section 50 controls a phase of a component (frequency bin) of the noise dominant frequency BN specified in the frequency specifying section 40 on a frame by frame basis, and outputs a component of the signal dominant frequency BS without phase control. In this regard, the configuration of FIG. 1 for specifying the noise dominant frequency BN on the basis of the second spectrum QB after suppressing the noise component is advantageous in that the noise dominant frequency BN can be specified with higher accuracy as compared with the configuration of FIG. 2.

In the above, a configuration for specifying a noise dominant frequency BN on the basis of a harmonic structure of a spectrum (a second spectrum QB of FIG. 1 or a first spectrum QA of FIG. 2) has been illustrated, but a well-known technique can be arbitrarily adopted as a method in which the frequency specifying section 40 specifies a noise dominant frequency BN (a method in which a signal dominant frequency BS and a noise dominant frequency BN are selected). For example, the noise dominant frequency BN can be specified using a plurality of microphones as disclosed in the technique of JP-A-2006-197552.

Figure 3:
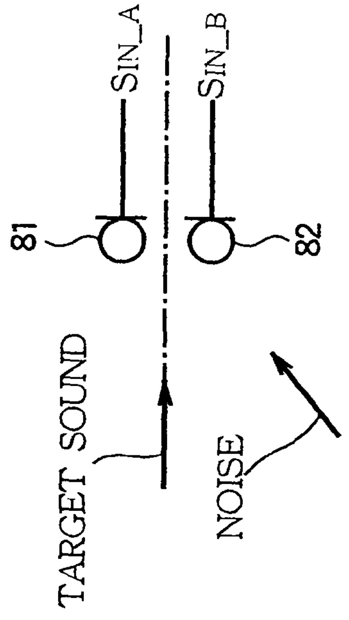
FIG. 3 is a block diagram showing a configuration of a noise suppressing apparatus related to a modified example.

As shown in FIG. 3, a first microphone 81 and a second microphone 82 are arranged at an appropriate interval in a direction perpendicular to a target sound arrival direction. The first microphone 81 generates a sound signal SIN_A and the second microphone 82 generates a sound signal SIN_B. The frequency specifying section 40 compares a differential spectrum PA between the sound signal SIN_A and the sound signal SIN_B (a power spectrum in which a target sound has been suppressed) and a differential spectrum PB between signals obtained by delaying the sound signal SIN_A and the sound signal SIN_B (a power spectrum in which noise other than the target sound has been suppressed). The frequency specifying section 40 selects a frequency in which the strength of the spectrum PA is less than that of the spectrum PB as a signal dominant frequency BS, and selects a frequency at which the strength of the spectrum PB is less than that of the spectrum PA as a noise dominant frequency BN. In the configuration using the harmonic structure, the accuracy of specifying the noise dominant frequency BN may be lowered (noise is misidentified as a signal component) when noise includes a vocal sound, but the noise dominant frequency BN can be specified with a high accuracy irrespective of acoustic characteristics of noise according to the configuration using the plurality of microphones as shown in FIG. 3.

(3) Modified Example 3

In the above embodiment, a configuration for subtracting an estimation noise spectrum QN from a spectrum QA has been illustrated, but the noise suppressing section 30 suppresses a noise component by various methods. For example, a configuration for performing an individual weighting process for each frequency band of the spectrum QA is adopted. A weight value of a frequency band of a signal component and a weight value of a frequency band of a noise component are individually set such that the noise component is suppressed. Moreover, a spectrum QB can be generated by extracting only a component of the frequency band of the signal from the spectrum QA (namely, destroying a component of the frequency band of the noise).

Figure 4:
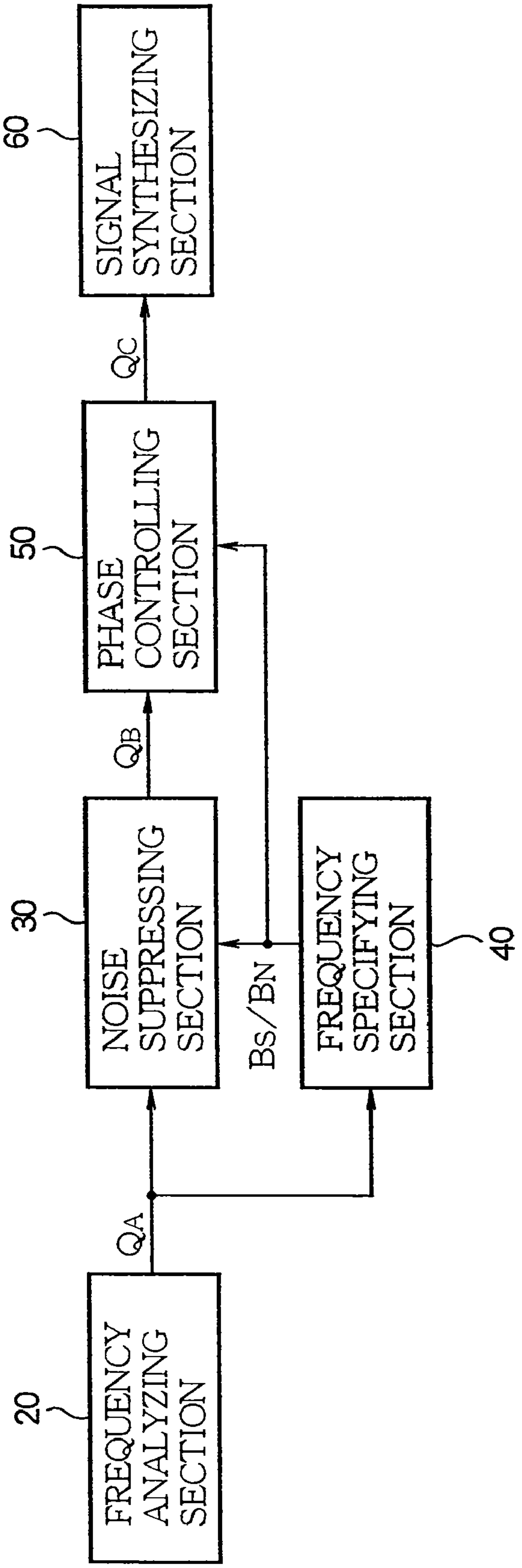
FIG. 4 is a block diagram showing a configuration of a noise suppressing apparatus related to a modified example.

In a configuration in which a frequency band of a signal component and a frequency band of a noise component are separated from each other to suppress the noise component, a configuration is preferable in which a result of specification by the frequency specifying section 40 is shared between the noise suppressing section 30 and the phase controlling section 50. That is, as shown in FIG. 4, for example, the noise suppressing section 30 suppresses the noise component by performing a weighting process using individual weight values in the signal dominant frequency BS and the noise dominant frequency BN specified in the frequency specifying section 40. As in the configuration of FIG. 1 or FIG. 2, the phase controlling section 50 controls a phase of a component (frequency bin) of a noise dominant frequency BN specified in the frequency specifying section 40 on a frame by frame basis in the spectrum QB after processing by the noise suppressing section 30, and outputs a signal dominant frequency BS without phase control. According to the above configuration, a configuration of the noise suppressing apparatus 100 can be simplified or its processing amount can be reduced.

(4) Modified Example 4

The variation amount setting section 52 sets a phase variation amount by various methods. A configuration in which the variation amount setting section 52 performs a predetermined arithmetical operation and computes a variation amount of each frame can also be adopted. For example, there is adopted a configuration in which a phase variation amount of a corresponding frame is computed in the four arithmetical operations (for example, addition of a strength and a predetermined value) according to the strength of a spectrum QB in a noise dominant frequency BN of each frame. Moreover, one of a predetermined number of numerical values can be selected as a variation amount in an order filter process. That is, a configuration in which phase variation amounts are different between frames in tandem is suitably adopted in the present invention. In this regard, phase variation amounts do not need to be different between all frames in tandem. A configuration in which a phase variation amount is controlled in a unit of two or more frames can be adopted.

(5) Modified Example 5

Figure 5:
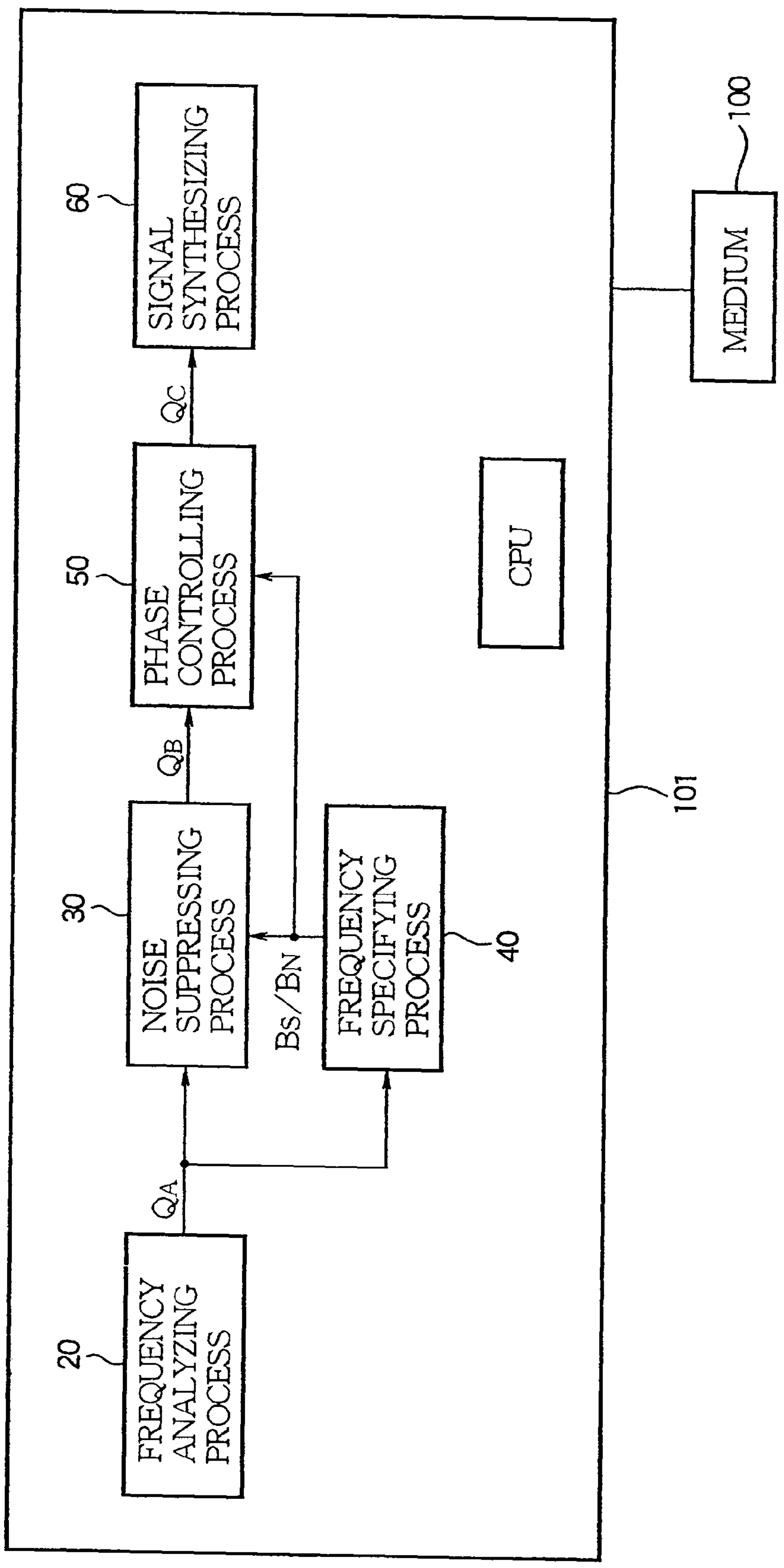
FIG. 5 is a block diagram showing a configuration of a noise suppressing apparatus related to a modified example.

FIG. 5 is a block diagram showing a configuration of a noise suppressing apparatus related to a modified example. In this embodiment, a machine readable medium 100 such as HDD or ROM is provided for use in a computer 101 having CPU. The machine readable medium 100 contains a program executable by CPU to perform a method of suppressing a noise component of a sound signal which contains the noise component and a signal component. The method is comprised of a frequency analyzing process 20 of dividing the sound signal into a plurality of frames such that adjacent frames overlap with each other along a time axis, and computing a first spectrum QA of each frame, a noise suppressing process 30 of suppressing a noise component of the first spectrum QA so as to provide a second spectrum QB of each frame in which the noise component is suppressed, a frequency specifying process 40 of specifying a frequency of a noise component of each frame, a phase controlling process 50 of varying a phase of the noise component corresponding to the specified frequency in the second spectrum QB by a different variation amount each frame, and a signal synthesizing process 60 of combining the frames after the second spectrum QB of each frame is processed by the phase controlling process 50, such that adjacent frames overlap with each other along the time axis so as to output the sound signal.

The invention claimed is:

1. A noise suppressing apparatus for suppressing a noise component of a sound signal which contains the noise component and a signal component, the apparatus comprising:

a frequency analyzing section that divides the sound signal into a plurality of frames such that adjacent frames overlap with each other along a time axis, and that computes a first spectrum of each frame;

a noise suppressing section that suppresses a noise component of the first spectrum so as to provide a second spectrum of each frame in which the noise component is suppressed;

a frequency specifying section that specifies a frequency of a noise component of each frame;

a phase controlling section that varies a phase of the noise component corresponding to the specified frequency in the second spectrum by a different variation amount each frame; and a signal synthesizing section that combines the frames after the second spectrum of each frame is processed by the phase controlling section, such that adjacent frames overlap with each other along the time axis so as to output the sound signal.

2. The noise suppressing apparatus according to claim 1, further comprising a variation amount setting section that sets a different variation amount according to a random number generated for each frame, wherein the phase controlling section varies the phase of the noise component corresponding to the specified frequency by the different variation amount set by the variation amount setting section for each frame.

3. The noise suppressing apparatus according to claim 1, wherein the phase controlling section varies the phase of the noise component corresponding to the specified frequency provided that the specified frequency falls in a predetermined frequency range of the second spectrum.

4. The noise suppressing apparatus according to claim 1, wherein the frequency specifying section specifies a frequency of a noise component contained in the second spectrum.

5. The noise suppressing apparatus according to claim 1, wherein the frequency specifying section specifies a frequency of a noise component contained in the first spectrum.

6. The noise suppressing apparatus according to claim 5, wherein the noise suppressing section suppresses the noise component corresponding to the specified frequency.

7. A machine readable medium for use in a computer, the medium containing a program executable by the computer for suppressing a noise component of a sound signal which contains the noise component and a signal component, the program comprising:

a frequency analyzing process of dividing the sound signal into a plurality of frames such that adjacent frames overlap with each other along a time axis, and computing first spectrum of each frame;

a noise suppressing process of suppressing a noise component of the first spectrum so as to provide second spectrum of each frame in which the noise component is suppressed;

a frequency specifying process of specifying a frequency of a noise component of each frame;

a phase controlling process of varying a phase of the noise component corresponding to the specified frequency in the second spectrum by a different variation amount each frame; and a signal synthesizing process of combining the frames after the second spectrum of each frame is processed by the phase controlling process, such that adjacent frames overlap with each other along the time axis so as to output the sound signal.

* * * * *